US005365965A

United States Patent [19]

Dunn

[11] Patent Number: 5,365,965

[45] Date of Patent: Nov. 22, 1994

[54] HYDRAULIC AUTOMATIC SHUTDOWN VALVE SYSTEM

[75] Inventor: Wayne Dunn, Newcastle, Wyo.

[73] Assignee: Cambria Valve Corporation, Newcastle, Wyo.

[21] Appl. No.: 151,407

[22] Filed: Nov. 12, 1993

[51] Int. Cl.[5] .............................................. F16K 17/00

[52] U.S. Cl. .................................... 137/115; 137/462; 137/466

[58] Field of Search ................ 137/115, 462, 464, 466

[56] References Cited

U.S. PATENT DOCUMENTS

| | | | |
|---|---|---|---|
| 676,144 | 6/1901 | Martin | 137/466 |
| 3,476,133 | 11/1969 | Stedfeld | 137/115 |
| 5,289,843 | 3/1994 | Smith | 137/466 X |

*Primary Examiner*—Robert G. Nilson

[57] ABSTRACT

A hydraulic automatic shutdown valve system is described to minimize the cost and clean up associated with hydraulic fluid spills. The valve system senses a pressure drop in a fluid system and diverts fluid away from the failed area of a pressurized hydraulic system.

3 Claims, 13 Drawing Sheets

HYDRAULIC AUTOMATIC SHUTDOWN VALVE SYSTEM

FIELD OF THE INVENTION

This invention relates to improved methods, techniques and apparatus for added safety and enhanced environmental control in the use of hydraulic equipment. More specifically, this invention relates to an automatic shutdown valve system for use in a hydraulic system to avert the unfavorable effects which hydraulic line failure can cause.

BACKGROUND OF THE INVENTION

Throughout the mechanized world the use of hydraulic systems abound, from heavy earth moving equipment, aircraft control systems, even entertainment rides at amusement parks. All of these depend on the integrity of the system's components for safe completion of their task.

To date there has been limited focus on the need for enhancing the safety of these potentially dangerous systems. Hydraulic or liquid pressurized systems often experience line failure such as a sever leak or break. When the failure occurs, other damage to peripheral equipment, environmental contamination and personal injury can also take place. For example, the hydraulic pump, still running, can empty a reservoir and then run dry causing the pump to be destroyed. Hydraulic fluid would be pumped onto the ground causing detrimental effects to the environment. If the line failure was a complete break, the resultant whiplash could seriously injure workmen standing immediately nearby, and if the line failure was a severe leak the spraying fluid could cause other types of harm to personnel. Hydraulic fluid could also spew onto diesel engine manifolds, or other hot surfaces or electric circuits, causing a fire to completely destroy the surrounding equipment. It is, therefore, desirable to provide adequate safety precautions to guard against these hazards.

Problems associated with these hydraulic fluid spills from broken lines have only recently been addressed due to heightened awareness on the part of environmental groups and actions taken by the Environmental Protection Agency, Department of Environmental Quality, the U.S. Forest Service and other interested parties.

Currently, there are many different types of equipment in use with limited or no safeguards. For instance, the logging industry utilizes hydraulic boom trucks for the loading of downed timber. If during operation, a hydraulic line breaks, not only is the load dropped but the resultant high pressure spray of fluid can contaminate several hundred square feet of forest area which results in a substantial economic cost to clean up, as required by forestry officials.

There are many stop-gap approaches to the problem. Currently there are several types of single devices used by industry which will actuate when line failure occurs. One such device is called a velocity fuse that can be used to temporarily stop pressurized flow because of the increased fluid velocity that would be flowing across the unit's seat when failure occurred. A more recent development, also called a hydraulic fuse, operates primarily by pressure loading an internal piston, and the drop in operating pressure as seen at its outlet port. Another singular valve design sees line pressure acting upon a semi-balanced piston that is held open by a shear pin. When line failure occurs the piston's loading force is increased due to increased differential pressure, thus destroying the shear pin and providing the means for the valve to close. These designs are singular in that they have provisions for only two flow ports, i.e., one inlet and one outlet port. By design they are flow-limited and therefore have limited application.

On the other hand, large cross-country pipe lines utilize two-way (either on or off) valves that utilize sensing lines. These units are not usually flow-limited but could not be installed into normal hydraulic service due, in part, to their extremely large physical size and their mandatory use of upstream and downstream pressure sensing instrument lines. At best, these designs could only partially solve the problem at hand and none as yet address, not only the fluid loss issue, but the continued operation of the hydraulically-operated equipment.

It is the objective of this invention to provide improved techniques and apparatus to control the detrimental effects of hydraulic system line failure.

It is another objective of this invention to reduce the time, effort, paperwork, and economic cost which is associated with hydraulic fluid spills and the resulting clean up actions that are required of system operators.

It is yet another objective of this invention to significantly reduce the risk of injury to the thousands of personnel who labor on or around equipment or machines that are controlled or operated by high pressure hydraulic systems.

SUMMARY OF THE PRESENT INVENTION

In accordance with the present invention there is provided a technique and apparatus to (1) shutoff the flow of pressurized fluid when line failure occurs, (2) and immediately divert the energized flowing fluid either directly to the circuit's reservoir (transfer system), or (3) divert the pressurized hydraulic fluid to a mating and latching type three port shuttle valve (redundant system) to provide the means to continue operation in spite of the failed hydraulic conduit.

In a preferred embodiment the invention comprises a self-contained hydraulic automatic shutdown valve system which comprises:

(a) a housing including an inlet port and an outlet port; wherein the housing further includes an elongated cavity; wherein the inlet port and outlet port each communicate with the cavity; and wherein the cavity includes first and second sections;

(b) piston means within the cavity; wherein the piston means comprises first and second interconnected piston members which are movable in the first and second cavity sections, respectively;

(c) first and second charging valve means communicating between the inlet port and the first and second cavity sections, respectively;

(d) An unloading valve means communicating between the second cavity section and the outlet port for pressure sensing.

In operation the Automatic Shutdown (ASD) Valve will sense a line failure, actuate and divert the pressurized fluid either to the systems reservoir tank or through a redundant line and shuttle valve to continue operation of the system.

The main disadvantage of the previously mentioned systems is that none of them divert the pressurized fluid if a failure occurs. Rather, fluid flow just stops, thus causing a massive pressure buildup from the shut-off component back to the pump. This pressure build up will increase the stress on every component prior to the shut off point, including the pump, thus possibly resulting in another line failure or a ruptured pump. This will not happen with the ASD Valve of this invention because fluid is diverted, not stopped.

The automatic shutdown valve system also restrains fluid loss, diminishes the possibility of human injury, reduces additional equipment damage, nullifies the possibility of fire, negates downtime and circumvents environmental contamination associated with hydraulic line failure.

Other advantages of the automatic shutdown valve system of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
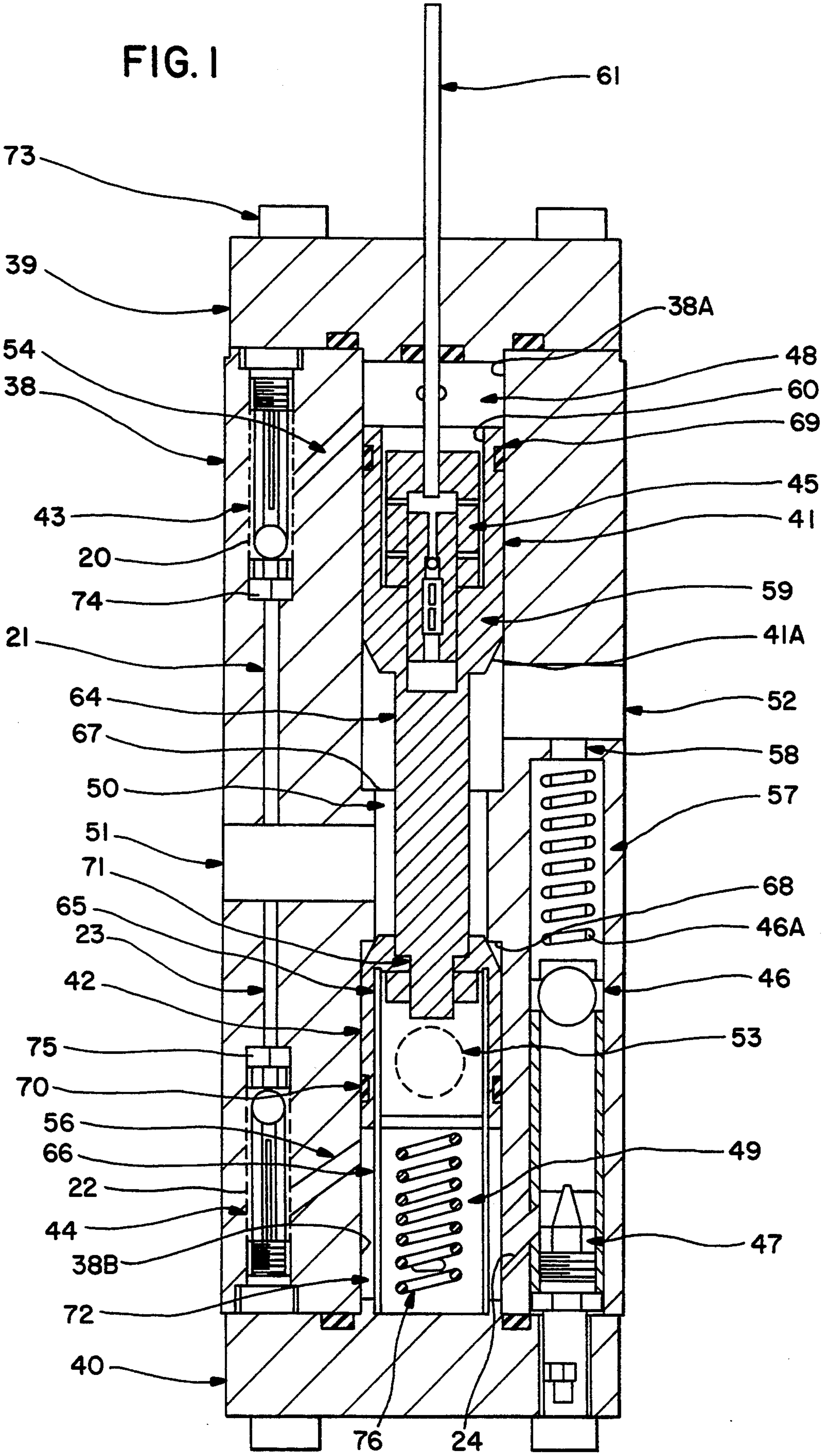
FIG. 1 is a cross-sectional view of one embodiment of automatic shutdown valve system of the invention shown in a normally open operational position.

A preferred embodiment of the self-contained hydraulic automatic shutdown (ASD) valve system 10 of the invention is shown in the drawings. FIG. 1 is a cross-sectional view of the ASD comprising a housing 38, an upper cap 39, a lower cap 40, an upper piston sub-assembly 41, a lower piston 42, an upper chamber charging valve sub-assembly 43, a lower chamber charging valve subassembly 44, a lower chamber pressure unloading valve 46, and a lower chamber time delay valve 47.

The housing includes a central elongated cavity which has an upper section 48, a lower section 49, and a center section or chamber 50 which receives flow from the primary inlet port 51. A bypass or secondary outlet port 53 communicates with the lower cavity section 49 and is perpendicular thereto. All ports 51, 52 and 53 are preferrably perpendicular to the center chamber 50 to minimize the restriction of the fluid flowing through the valve.

The housing also includes a bore 20 for receiving an upper charging valve assembly 43. A passageway 54 extends between the bore 20 and the upper cavity section 48. Another passageway 21 extends between bore 20 and the inlet port 51. When pressurized fluid enters the housing through port 51, a small portion of the fluid flows through passageway 21, valve 43, and passageway 54 to the upper cavity section 48.

Valve 43 is an adjustable ball and spring type check valve with a changeable orifice inlet 74. This valve assembly is designed to allow a set amount of fluid to flow through and enter chamber 48. The valve 43 is adjustable to allow for different inlet port sizes and varying flow rate and pressure settings. Passageways 21 and 54 are not relative to the inlet port 51's size due to the adjustability of valve assembly 43. Valve 43 is also designed so that if pressure at inlet port 51 falls the check-ball in valve 43 will fall against its seat maintaining pressure in the upper chamber 48.

The housing further includes a bore 22 for receiving a lower charging valve assembly 44. A passageway 56 extends between the bore 22 and the lower cavity section 49. Another passageway 23 extends between bore 22 and the inlet port 51. When pressurized fluid enters the housing through port 51, a small portion of the fluid flows through passageway 23, valve 44, and the passageway 56 to the lower cavity section 49.

The housing also includes another secondary bore 57 therein for receiving a pressure unloading valve assembly 46 and a time delay valve assembly 47. A passageway 58 extends between bore 57 and the outlet port 52, and a passageway 24 extends between cavity section 49 and bore 57.

Valve 44 is an adjustable ball and spring type check valve with a changeable orifice inlet 75. This valve assembly is designed to allow a set amount of fluid to flow through and enter chamber 49. The valve 44 is adjustable to allow for different inlet port sizes and varying flow rates and pressure settings. Passageways 23 and 56 are not relative to the inlet port 51's size due to the adjustability of valve assembly 44. Valve 44 is also designed so that if pressure at inlet port 51 drops the check ball in valve 44 will fall against its seat maintaining pressure in lower chamber 49.

Valve 46 is a ball and spring assembly that is sensitive to the outlet pressure of the ASD by means of a passageway 58 extending into the outlet port 52. Fluid flows to valve 46 from the lower chamber 49 via valve 47 and lifts the ball off its seat allowing fluid to flow through the valve 46 through passageway 58 and into the outlet port 52. If the pressure at the outlet port 52 of the ASD falls dramatically the valve 46 will move further away from its seat allowing a greater amount of fluid to flow through thus instantly dropping the pressure in chamber 49 of the ASD. The instant drop in pressure in chamber 49 results in a greater amount of pressure at the top of the piston in chamber 48 thus forcing the piston down to its closed position.

Valve 47 is a threaded needle type valve that is adjustable and controls the fluid flow from the lower chamber 49 to valve 46. This is called a timing delay valve due to the fact that it is greatly controls the sensitivity of the ASD valve, not closing under normal pressure variations in the system, but still sensing a line failure.

The piston means comprises an upper piston member 41 (which is slidably movable in the upper cavity section 48) and a lower piston member 42 (which is slidably movable in the lower cavity section 49). The two piston members are connected together by means of shaft 64. The lower end of shaft 64 is threaded for receiving a fastener 65 to hold the two piston assemblies together.

Piston 41 includes a recess or bore 60 for receiving a position indicator assembly 61.

Piston 41 is biased to a normally upward position (shown in FIG. 1) by means of compression spring 76. When piston 41 is in its normal upward position, piston 42 is also in its normal upward position where the upper end of piston 42 is pressed tightly against valve seat 68 at the upper end of cavity section 49. This prevents fluid from flowing past valve seat 68. A seal 70 extends around piston 42 to form a seal between this piston and the walls of cavity section 49.

When piston 41 is in its upper position, as shown in FIG. 1, fluid is permitted to flow from port 51 through central cavity 50 and then through outlet port 52. Seal 69 extends around piston 41 to form a seal between the piston and the walls of cavity section 48.

Figure 2:
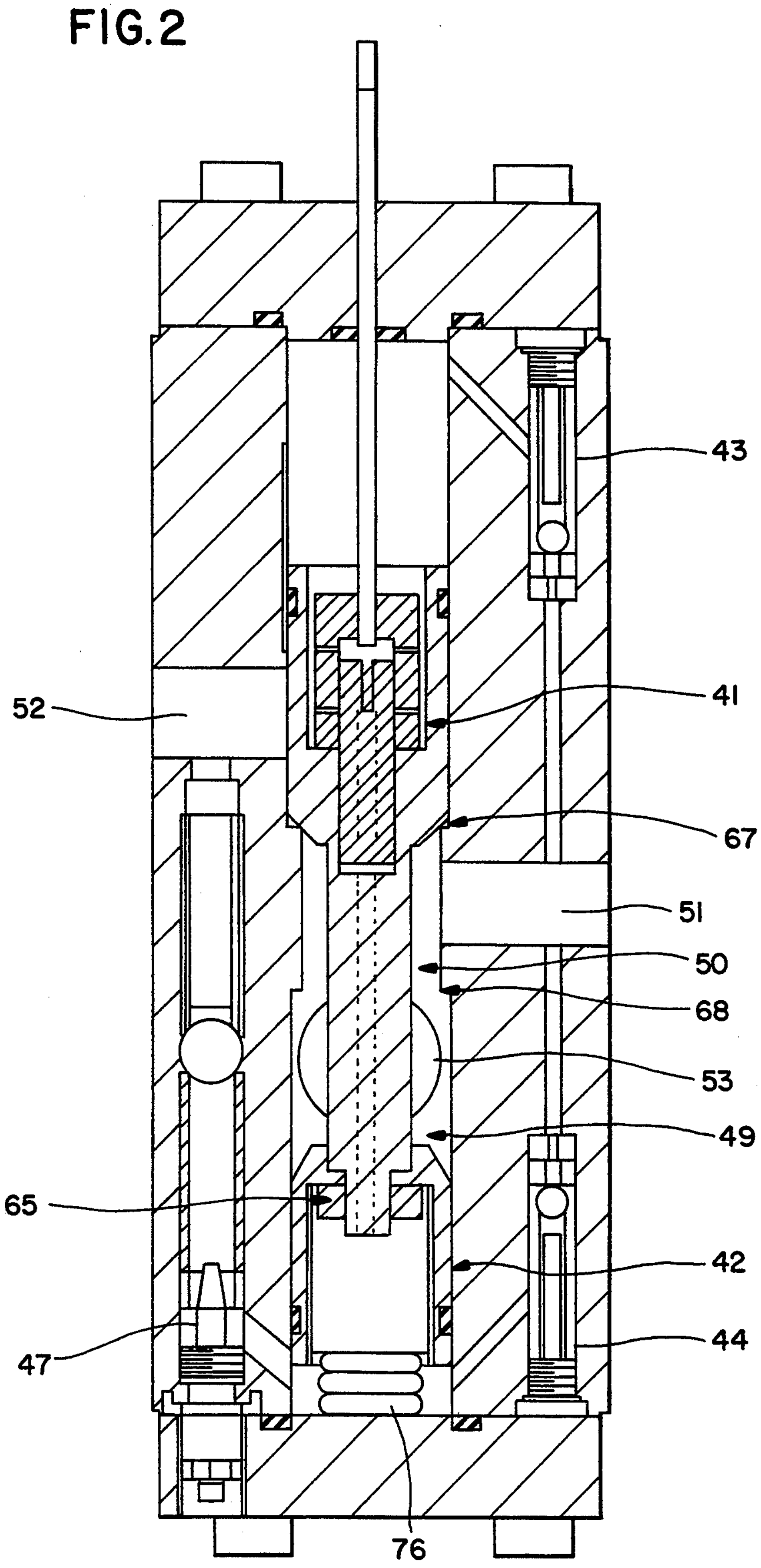
FIG. 2 is a cross-sectional view of the embodiment of FIG. 1 showing the location of the piston in shutdown position.

When piston 41 is caused to move to its downward position (shown in FIG. 2), the lower end of piston 41 is pressed tightly against seat 67 and blocks fluid flow through cavity section 50. At the same time, piston 42 moves away from seat 68 to thereby enable fluid to flow past seat 68 and into lower cavity section 49 and then out through port 53.

The connecting shaft 64 may include a seal 71 around its circumference at the lower end to prevent leakage of fluid from the central cavity section 50 to the lower cavity 49.

After the shutdown valve system has been installed in a hydraulic circuit, hydraulic fluid is introduced into the valve system through the primary inlet port 51. The fluid flows through the valve system via central cavity section 50. Hydraulic fluid also fills cavity section 48 and cavity section 49 by means of charging valves 43 and 44. These valves create pressure imbalance by means of the orifice 74 in charging valve 43 and the orifice 75 in charging valve 44. A larger orifice 75 in valve 44 allows more fluid to enter chamber 49 than can enter chamber 48 due to a smaller orifice 74 in charging valve 43. This unbalanced condition provides the resultant force required to maintain the normally open mode of the shutdown valve system during normal operation.

The lower cavity section 49 pressure unloading valve 46 continuously hunts for variation of downstream pressure through outlet port 52. Fluid from the lower cavity section 49 is allowed to pass through the timing delay valve 47 to exit through the pressure unloading valve 46 to the outlet port 52.

When the upper cavity section 48 force component exceeds the lower cavity section 49 force component, the piston 41 is forced downward, thereby closing outlet port 52 and opening the bypass outlet port 53. This provides the means for the hydraulic fluid to displace to a redundant or transfer system mode. The differential pressure acting between the lower cavity section 49 and the inlet port 51 ensures that the lower cavity unloading valve 46 will remain open, thus discharging any significant pressure build-up in the lower cavity 49.

Figure 3:
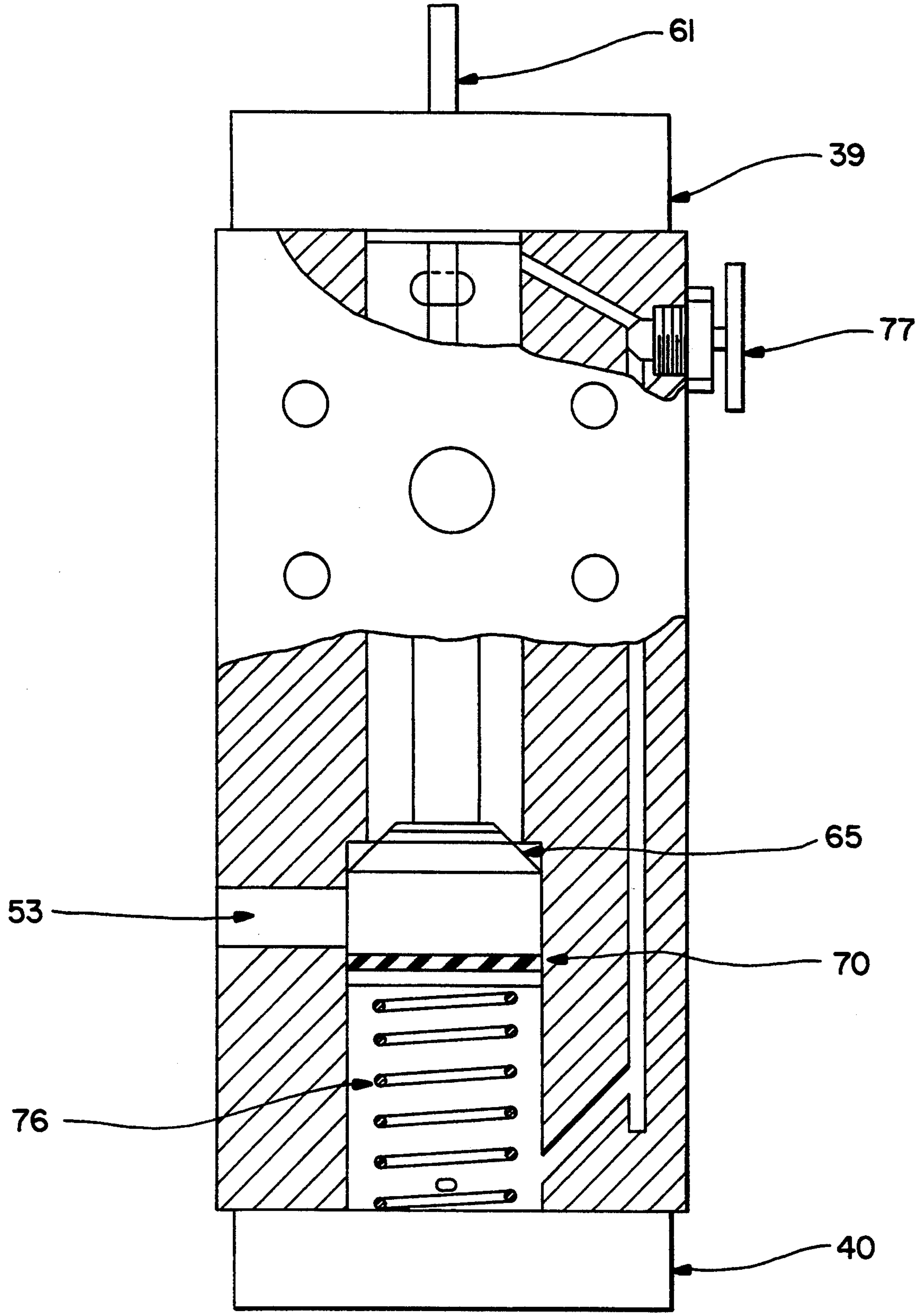
FIG. 3 is a side elevational, partially cut-away view of a preferred reset valve configuration.
Figure 4:
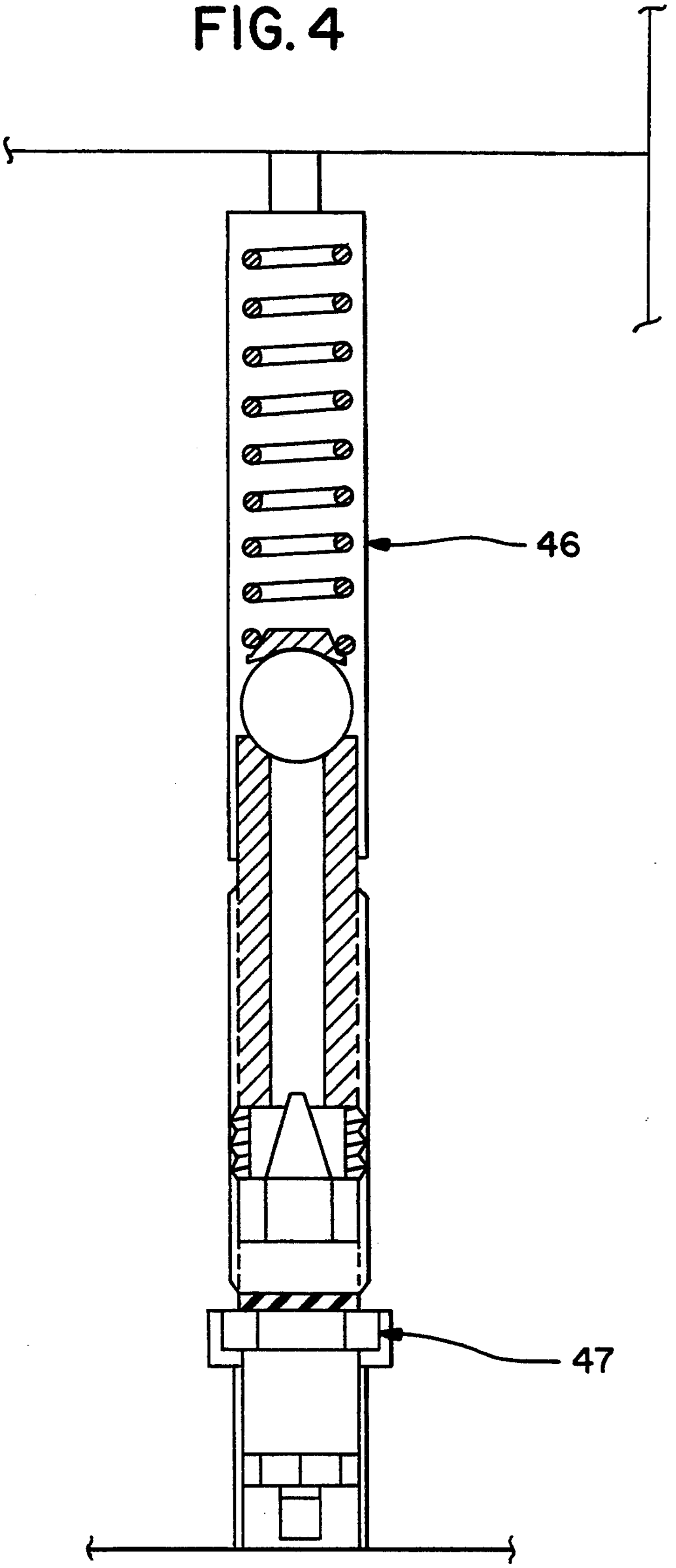
FIG. 4 is a cross-sectional view of the valve system time delay and lower chamber pressure unloading valve sub-assemblies.
Figure 5:
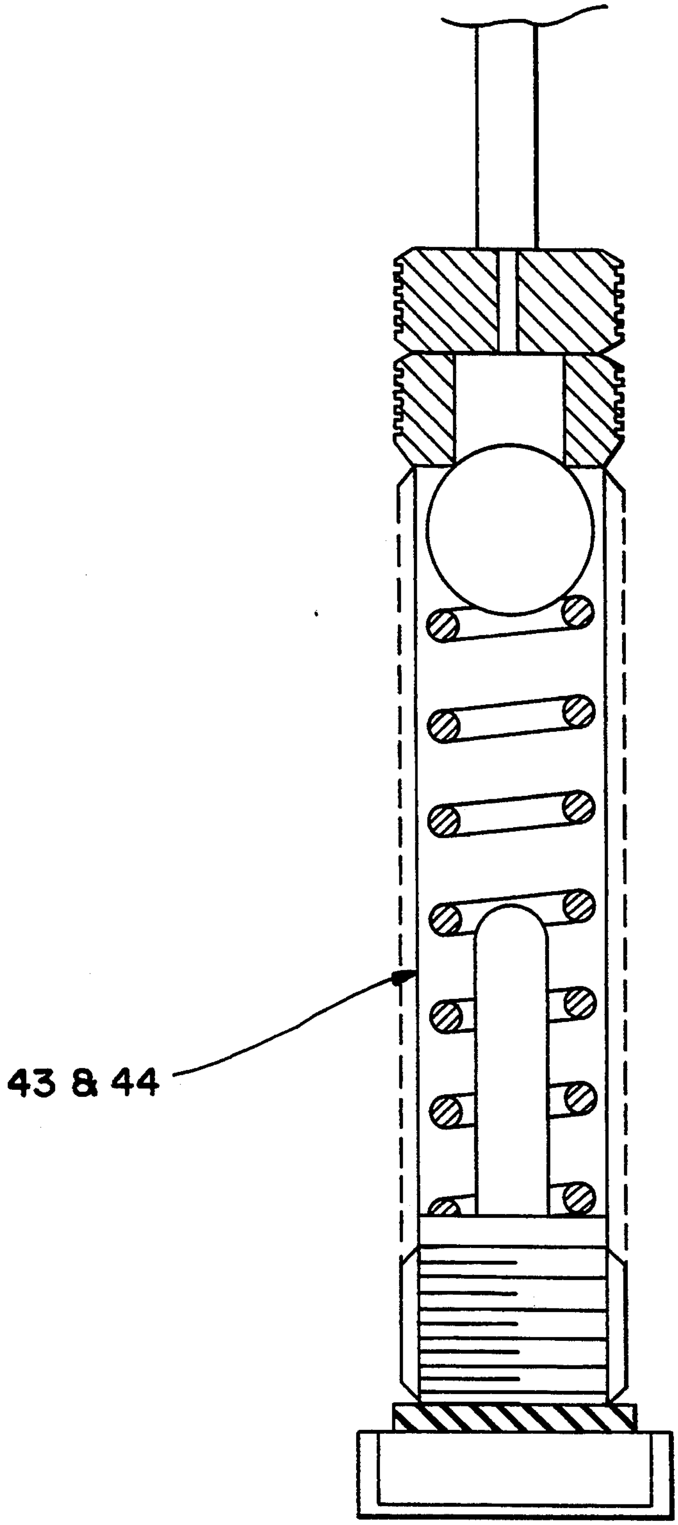
FIG. 5 is a cross-sectional view of the valve upper and lower chamber charging valve sub-assemblies.
Figure 6:
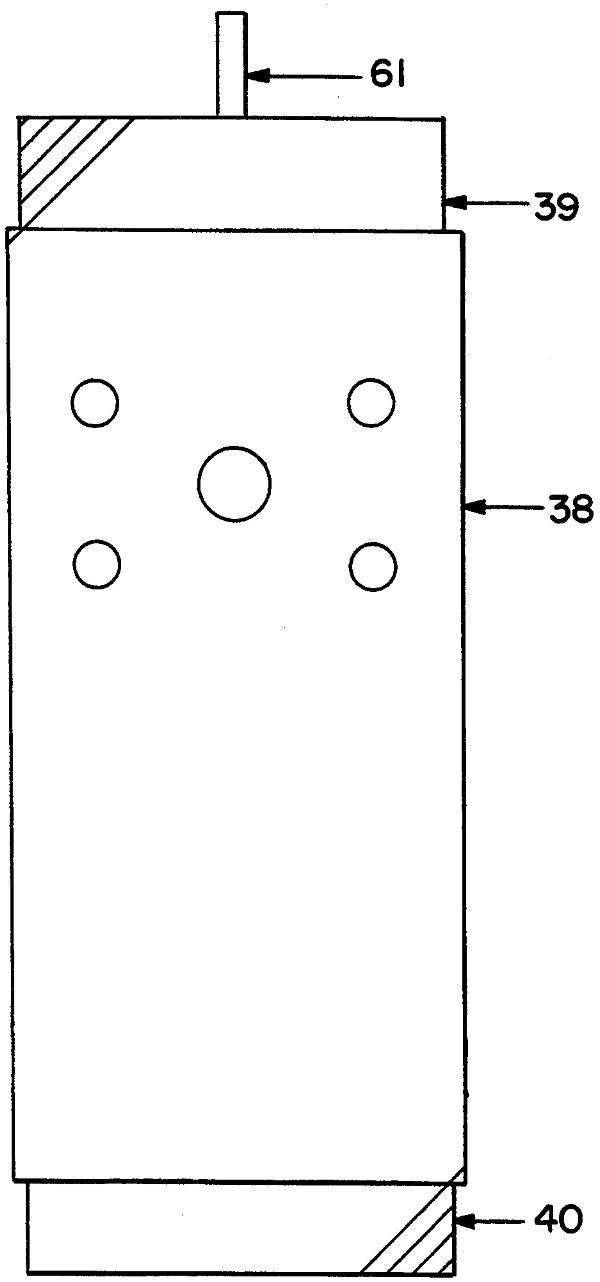
FIG. 6 is a rear elevational view of the self-contained automatic shutdown valve system showing one inlet port.
Figure 7:
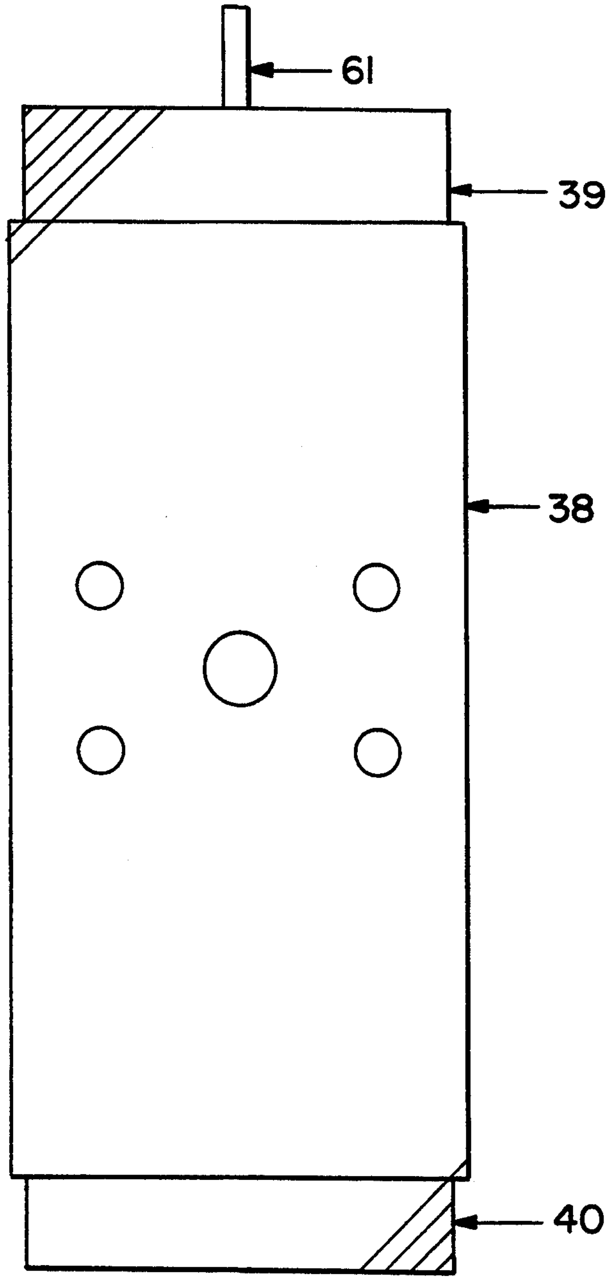
FIG. 7 is a front elevational view of the self-contained automatic shutdown valve system showing a primary inlet-outlet pressure port.
Figure 8:
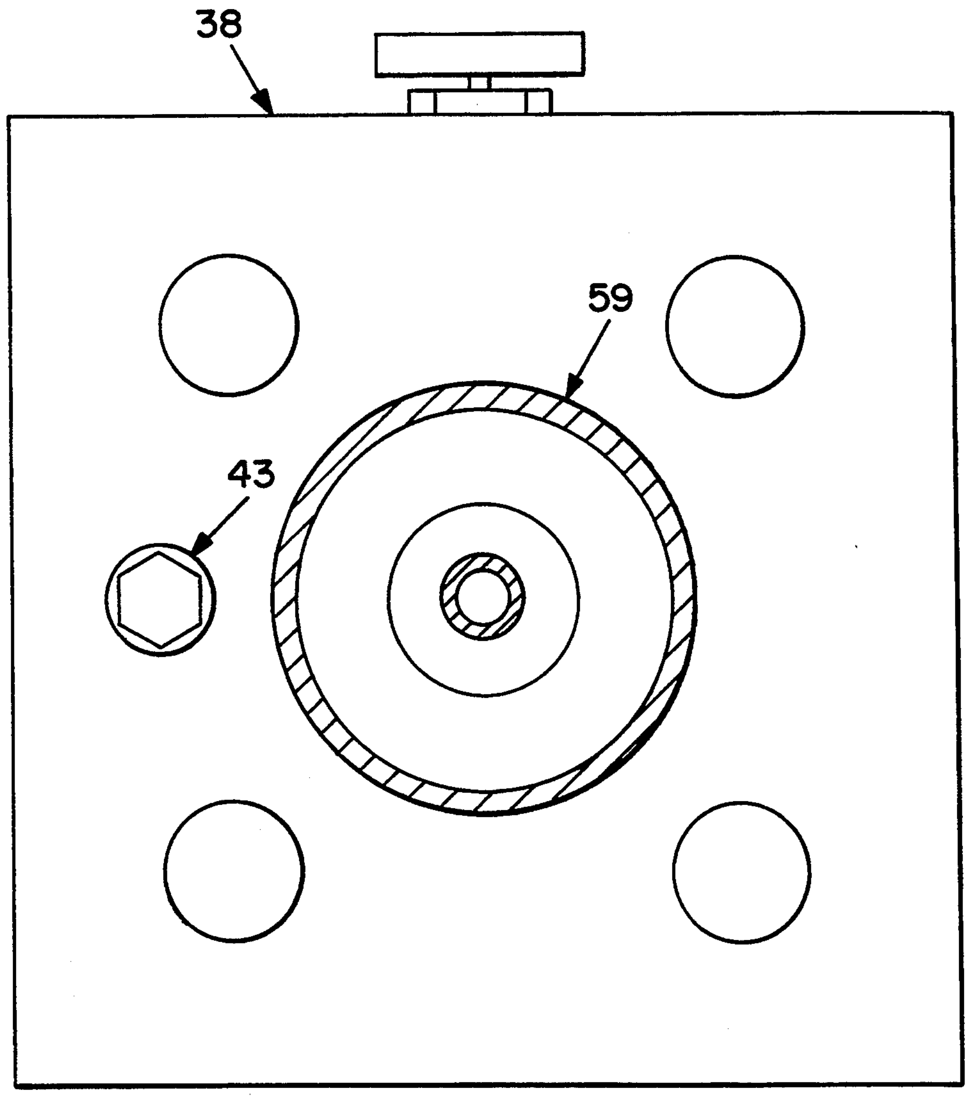
FIG. 8 is a cross-sectional view of the self-contained hydraulic automatic shutdown valve system upper chamber.
Figure 9:
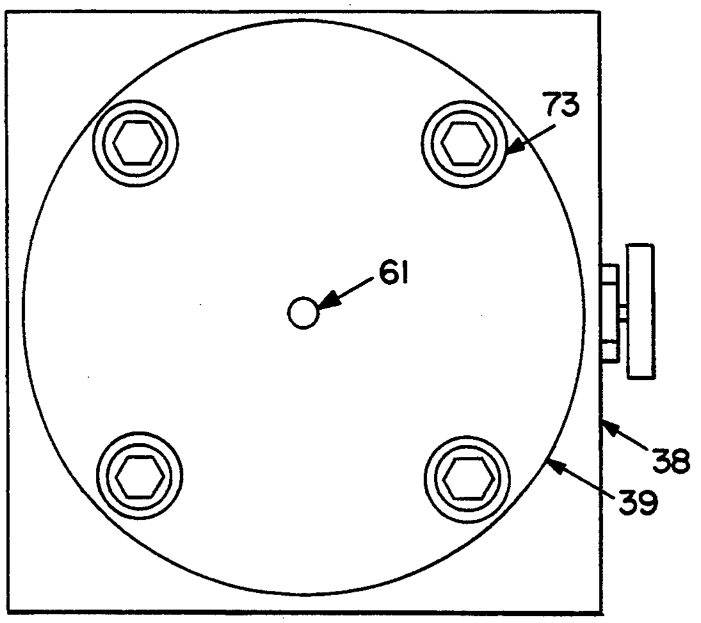
FIG. 9 is a top plan view of the self-contained hydraulic automatic shutdown valve system of FIG. 1.
Figure 10:
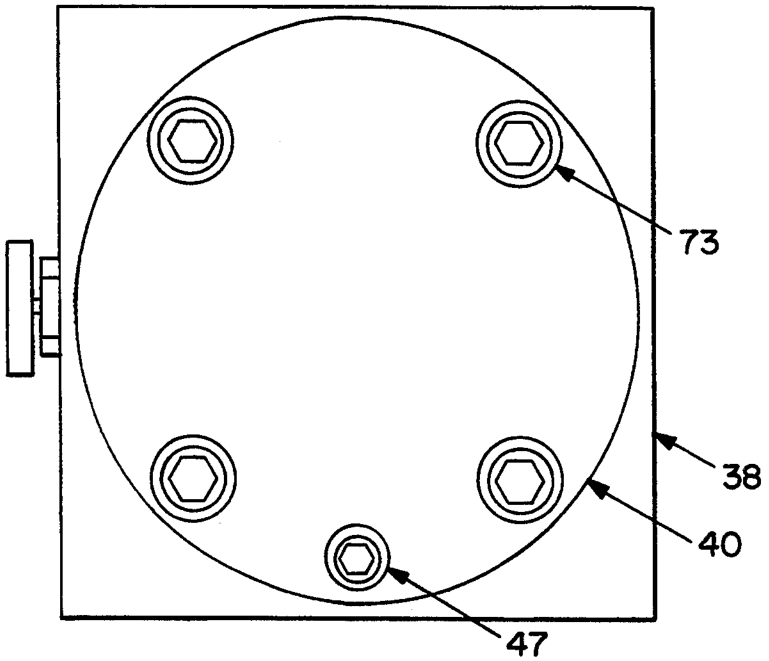
FIG. 10 is a bottom view of the valve system of FIG. 1.
Figure 11:
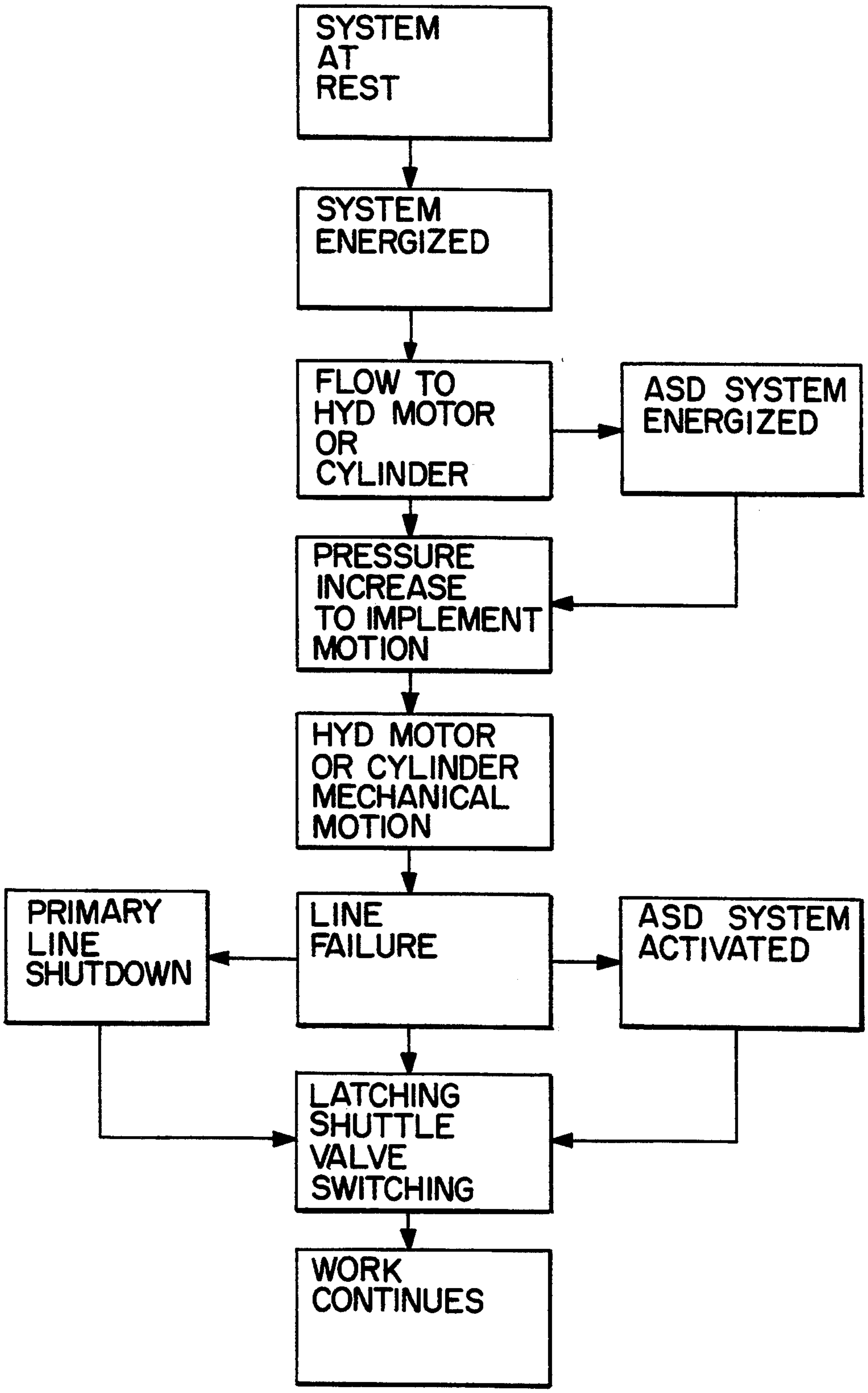
FIG. 11 is a block diagram that describes the sequence of functional events within a typical hydraulic circuit of a redundant configuration of the self-contained hydraulic automatic shutdown valve system of the invention.

The automatic shutdown valve system is reset to normal open position by opening a manual reset valve 77 (see FIG. 3). This enables pressurized fluid from the upper cavity 48 to re-fill the lower cavity 49. This pressurized fluid in conjunction with pressure from spring 76 forces the piston assembly up to its normal operating position.

To determine whether or not the ASD valve system is in the normally open, or closed, position, an indicator rod 61 is attached to upper piston assembly 41. When the indicator rod 61 is shown to be in the upward position the ASD valve system is in the normally open mode.

To prevent corrosion, the housing 38 is preferably machined from forged steel (CRES). All internal moving parts are also machined or formed from a variation of corrosion resistant stainless steels. Piston pressure seals are provided with back-up rings to prevent extrusion and internal leakage between the upper and lower chambers.

The upper cover 39 and lower cover 40 are concentrically attached to the housing by means of register diameters 72 that locate into the primary bores 38A and 38B of the housing 38. High stress bolts 73 are used to affix the two covers to the housing. Face seals are provided to prevent external leakage between the housing 38 and respective caps 39 and 40. This piston assemblage 41 retains cutting edges 41A to shear through potential contamination buildup within the housing 38.

Figure 12:
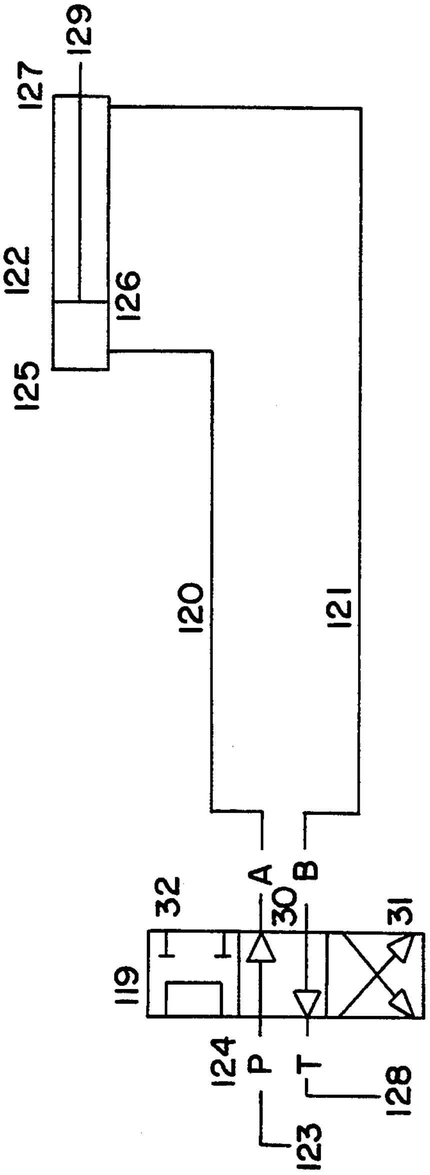
FIG. 12 is a hydraulic schematic of an ordinary prior art circuit without an automatic shutdown valve system.

FIG. 12 is a schematic diagram representing a typical prior art hydraulic circuit that includes a typical four way 3 position control valve 119, pressure line 120, return line 121, and a double acting cylinder 122. Fluid is transmitted by the circuit's pump (not shown) via the primary pressure line 120 and received at the pressure port 124 of the four way 3 position valve 119 and is then routed directly through pressure line 120 to the blind side 125 of the double acting cylinder 122. When the circuit's pressure reaches an adequate level, the piston 126 of the double acting cylinder 122 is compelled to move to the right. Fluid located on the rod side 127 of the double acting cylinder 122 is then forced to channel out of the cylinder 122, through return conduit 121, the four way 3 position valve 119, and return to the circuit's reservoir (not shown) via the circuit's primary return line 121. To return the cylinder's rod 129 to its original location (left) the process is repeated by changing the position of the four way 3 position control valve 30 to 31. The double acting cylinder 122 can also be locked into any station along its deflection path by selecting position 32 of the four way 3 position control valve.

The double acting cylinder rod 129 performs mechanical work because of its ability to produce linear motion under load, i.e., resistance. The load limits of the mechanical work must then react directly upon the hydraulic pressure levels of the applicably hydraulic circuit. Spurious hydraulic pressure variations, usually produced in the form of pressure spikes, can reach pressure points far beyond that for which the circuit of FIG. 12 would be rated. These pressure spikes continuously act upon any weak point (stress riser) of any component in the circuit, and finally line failure will occur.

Figure 13:
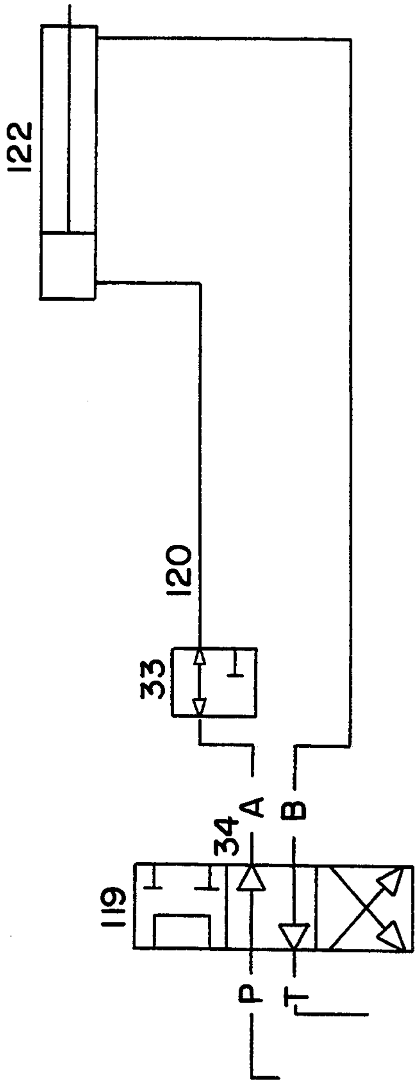
FIG. 13 presents a hydraulic schematic of the same circuit as shown in FIG. 12 that does include a self-contained hydraulic automatic shutdown (ASD) valve system of the invention.

FIG. 13 is a schematic diagram illustrating the circuit of FIG. 12 that includes a self-contained hydraulic automatic shutdown (ASD) valve system 33 installed on the pressure port 34 of the four way 3 position control valve 119. If line 120 failure should occur this installation configuration would be employed for immediate shutdown of the damaged pressure conduit 120. At the moment of failure the flow of pressurized fluid would be instantly shutoff.

Figure 14:
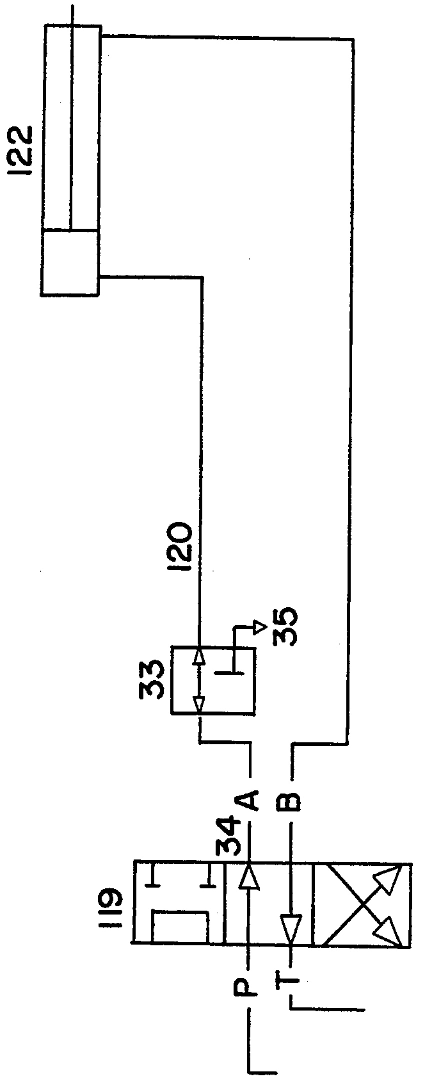
FIG. 14 represents a hydraulic schematic of the circuit shown in FIG. 12 that employs a self-contained hydraulic automatic shutdown (ASD) valve system used a fluid transfer device in accordance with this invention.

FIG. 14 is a schematic diagram illustrating the circuit of FIG. 12 that includes a self-contained hydraulic automatic shutdown (ASD) valve system 33 installed on the pressure port 34 of the four way 3 position control valve 119. If line failure should occur this installation configuration would be employed for immediate shutdown of the damaged pressure conduit 120. At the moment of failure pressurized fluid would instantly be transferred to the system's reservoir by the action of the ASD valve system 33, and the addition of a separate return line 35.

Figure 15:
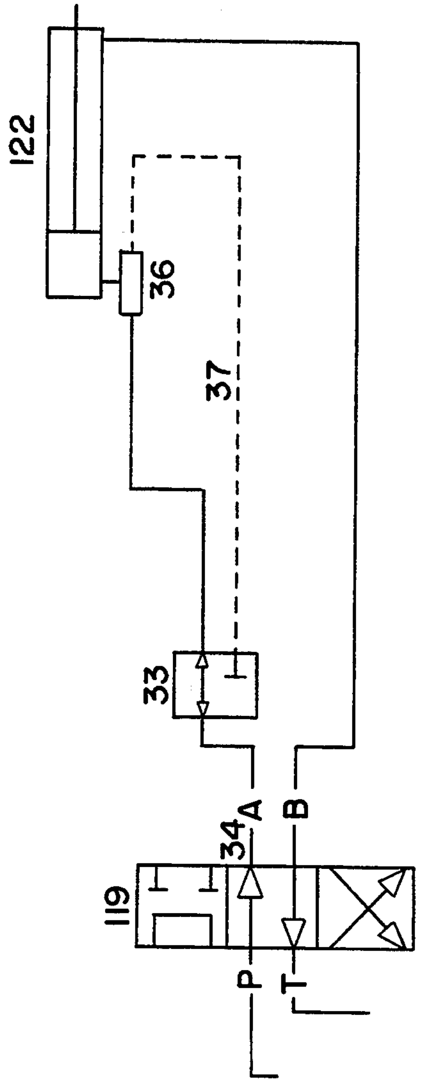
FIG. 15 represents a hydraulic schematic of the circuit shown in FIG. 12 that employs a self-contained hydraulic automatic shutdown (ASD) valve system used as a redundant circuit.

FIG. 15 is a schematic diagram illustrating the above circuit that included a self-contained hydraulic automatic shutdown (ASD) valve system 33 installed on the pressure port 34 of the four way 3 position control valve 119 and a latched three port shuttle valve 36 mounted to a port on double acting cylinder 122. If line failure should occur this installation configuration would be employed for immediate shutdown of the damaged pressure conduit 120. At the moment of failure pressurized fluid would instantly be routed direct to the redundant line 37, through the shuttle valve 36 and into the double acting cylinder 122, thus providing the means for mechanical work to continue.

Figure 16:
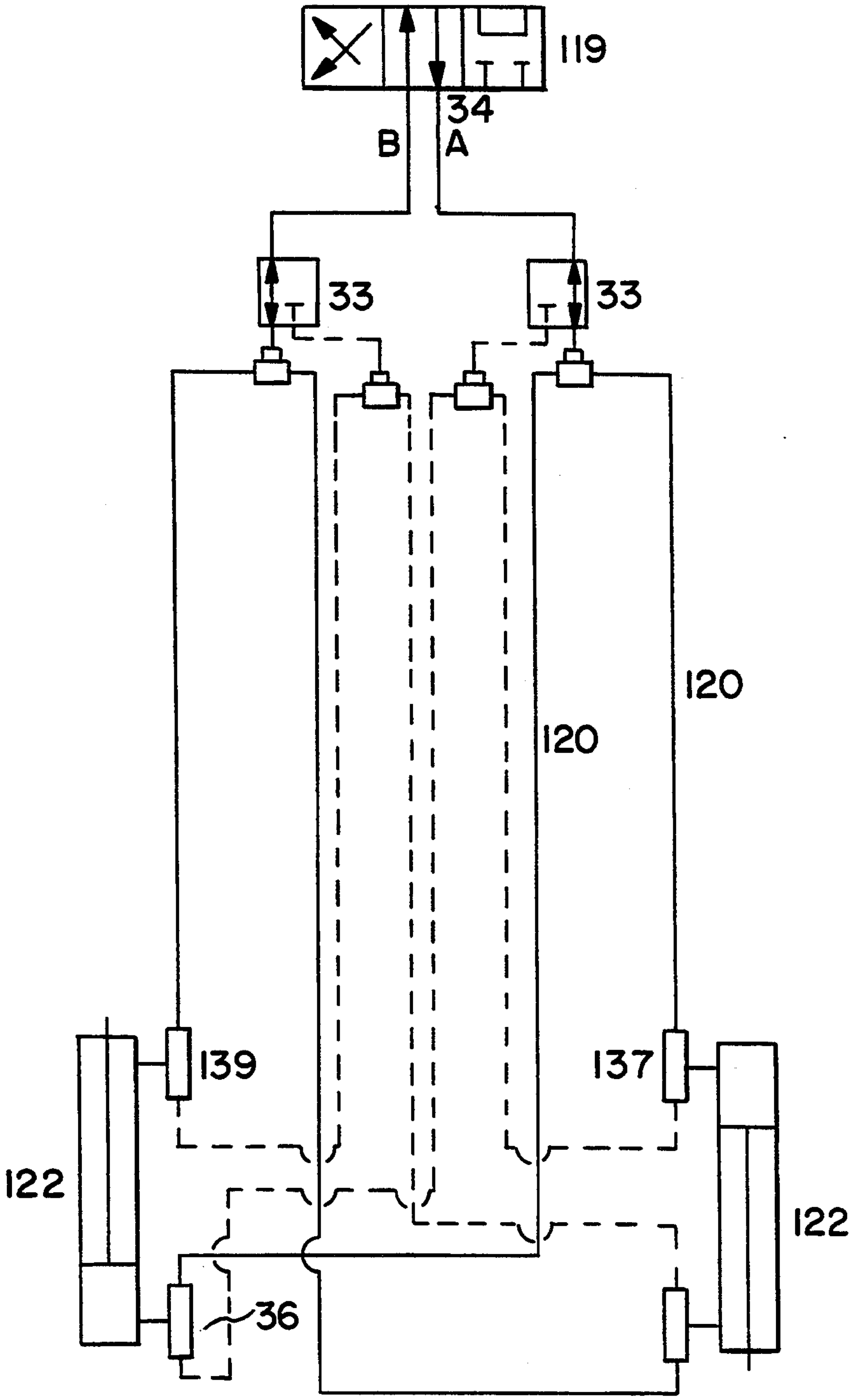
FIG. 16 represents a hydraulic schematic of the circuit shown in FIG. 15 that employs a double self-contained hydraulic automatic shutdown (ASD) valve system used as a double redundant circuit.

FIG. 16 is a schematic diagram illustrating the circuit of FIG. 15 above except that it includes two self-contained hydraulic automatic shutdown (ASD) valve systems 33 mounted on both the work ports 34A and 34B of four way 3 position control valve 119, and two mating and latching type shuttle valves 139 and 137. If line failure should occur this installation configuration would be employed for immediate shutdown of the damaged pressure conduit 120. At the moment of failure pressurized fluid would instantly be routed direct to a redundant line through a shuttle valve and into a double acting cylinder. Only the components of the other circuits would be standing by and ready to actuate at the moment of failure.

Other variants are possible without departing from the scope of this invention.

What is claimed is:

1. An automatic shutdown hydraulic valve system comprising:

(a) a housing including an inlet port and an outlet port; wherein the housing further includes an elongated cavity; wherein the inlet port and outlet port each communicate with the cavity; and wherein the cavity includes first and second sections;

(b) piston means within the cavity; wherein the piston means comprises first and second interconnected piston members which are movable in the first and second cavity sections, respectively;

(c) first and second charging valve means communicating between the inlet port and the first and second cavity sections, respectively;

(d) An unloading valve means communicating between the second cavity section and the outlet port for pressure sensing.

2. A system in accordance with claim 1, further comprising bias means for biasing said first piston member to a normal upward position.

3. A system in accordance with claim 2, further comprising a bypass port communicating with said second cavity section.

* * * * *